United States Patent [19]

Leclerc

[11] Patent Number: 4,995,097
[45] Date of Patent: Feb. 19, 1991

[54] RADIO SYSTEM TO ALLOW OF EXCHANGING MESSAGES BETWEEN A SET OF STATIONS

[75] Inventor: Daniel-Marie Leclerc, Clamart, France

[73] Assignee: U.S. Philips Corporation, N.Y.

[21] Appl. No.: 289,283

[22] Filed: Dec. 21, 1988

[30] Foreign Application Priority Data

Dec. 23, 1987 [FR] France .................. 87 18048

[51] Int. Cl.⁵ .................. H04Q 7/00; H04B 1/00
[52] U.S. Cl. .................. 455/33; 455/34; 455/51; 455/56; 379/60; 375/5
[58] Field of Search .......... 455/33, 34, 54, 56, 455/67, 51; 379/60, 63; 375/5, 7, 8

[56] References Cited

U.S. PATENT DOCUMENTS

| | | | |
|---|---|---|---|
| 4,754,453 | 6/1988 | Eizenhöfer | 455/33 |
| 4,765,753 | 8/1988 | Schmidt | 455/33 |
| 4,799,252 | 1/1989 | Eizenhöffer et al. | 455/33 |
| 4,815,073 | 3/1989 | Grauel et al. | 379/60 |

FOREIGN PATENT DOCUMENTS 1591159 6/1981 United Kingdom .

OTHER PUBLICATIONS

G. Banquet et al., "Ramage, A Private Mobile Radio-telephone Network", Commutation and Transmission, No. 1, 1986, pp. 19-30.

*Primary Examiner*—Reinhard J. Eisenzopf
*Assistant Examiner*—Curtis Kuntz
*Attorney, Agent, or Firm*—Jack D. Slobod

[57] ABSTRACT

A radio system allows for exchanging messages between a set of relay stations (R1, R2, R3 ...) and mobile access stations (M ... ) for communications. At least one common semaphore channel is used through which the relay stations simultaneously transmit code signals (M(R1)+M(R2)+M(R3)+...) at first preset instants and separately transmit a code signal at other preset time instants, the access stations tap the said channel at these various preset instants and the recognition in the access station of code signals received in the first preset instants and the quality of code signals received in the other preset instants constitutes a criterion for establishing the connection between the access station and a relay station corresponding to the recognized code.

3 Claims, 4 Drawing Sheets

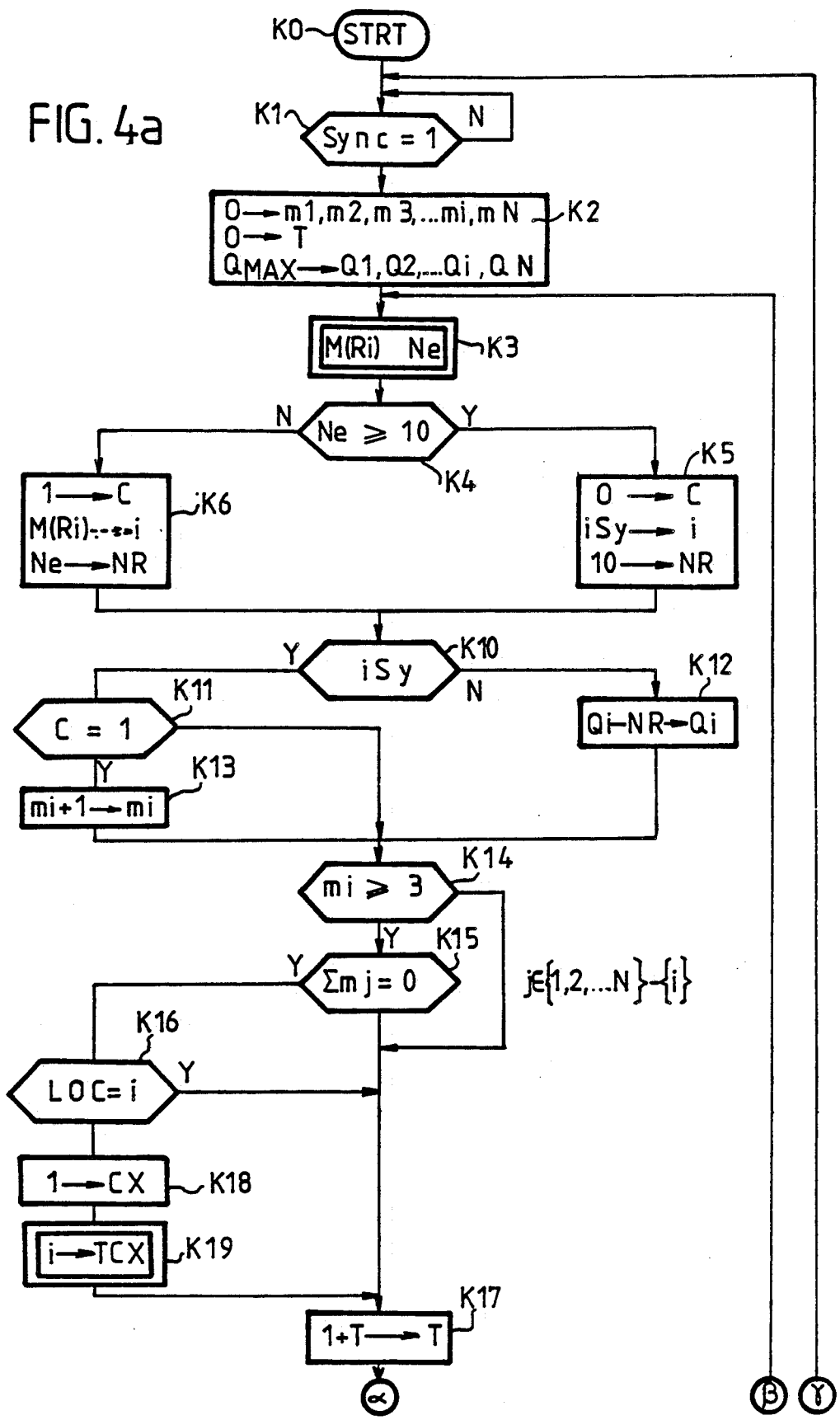

4,995,097

RADIO SYSTEM TO ALLOW OF EXCHANGING MESSAGES BETWEEN A SET OF STATIONS

BACKGROUND OF THE INVENTION

1. Field of the Invention

The present invention relates to a radio system for allowing for exchanging messages between a set of relay stations and access stations for communications, the system using a least one common semaphore channel which is specifically provided to establish the connections between relay stations and access stations and through which the relay stations can transmit a first code signal at first predetermined instants, whereas the access stations comprise means for tapping the said channel at these predetermined instants.

2. Description of the Related Art

Such a system is known from the British Patent Specification 1 591 159. In this system the code signals are constituted by tones: a first tone for indicating that the relay station transmitting the tone wishes to send a message to the access stations which capture the tone and a second tone for indicating that the relay station transmitting the tone does not have a message to be broadcast. Thus, if one access station receives various tones of different relay stations, it will only be sensitive to the first tone if its level exceeds the tones received second.

This known system presents a first disadvantage due to the fact that it is ill-adapted to networks using a semaphore channel and transmitting messages of the digital type, as is the case with the RAMAGE network. This network is described in the article entitled: "RAMAGE - A Private Mobile Radio Telephone Network" by G. Banquet, J. P. Pittion, M. Coudreuse and published in "Commutation and Transmit No. 1,1986, pp. 19–30".

SUMMARY OF THE INVENTION

One of the objects of the invention is to provide a radio system which is suitable for a RAMAGE network. Therefore, according to the invention, a system of the type mentioned in the preamble is characterized in that this code signal is formed by a digital code defining the relay station that transmits the signal and in that its recognition at the access stations is a criterion for establishing the connection.

A further object of the invention is to provide a radio system using various criteria for establishing the connection between the access station and the relay station. Therefore, according to the invention, a system of the type mentioned in the preamble, for which a semaphore channel is used for transmitting at preset second instants, of which each one is associated to a relay station, a second code signal in a digital form, is characterized according to a feature of the invention, in that for establishing the connection a second criterion is used consisting of analysing the transmitted quality of the second code signal.

BRIEF DESCRIPTION OF THE DRAWING

The following description, accompanied by the annexed drawings, all given by way of non-limiting example, will make it understood how the invention can be realised, in which:

FIGS. 4a and 4b show the flow chart managing the operation of the access station.

DESCRIPTION OF THE PREFERRED EMBODIMENT

Figure 1:
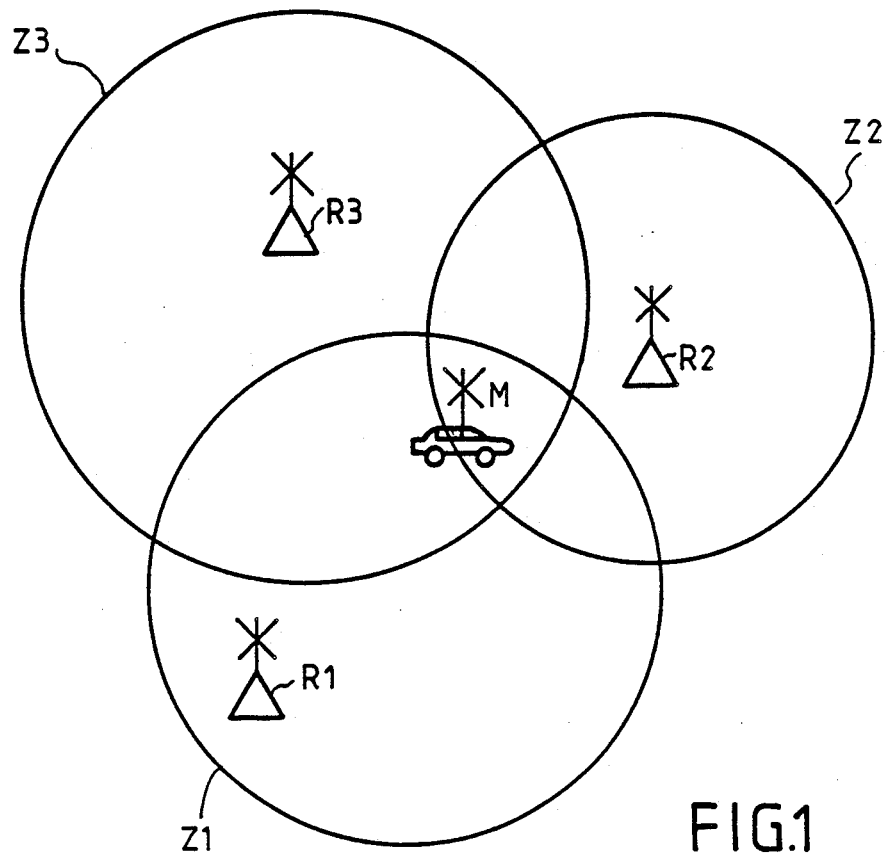
FIG. 1 shows a schematic spatial distribution of different stations of the system according to the invention.
Figure 2:
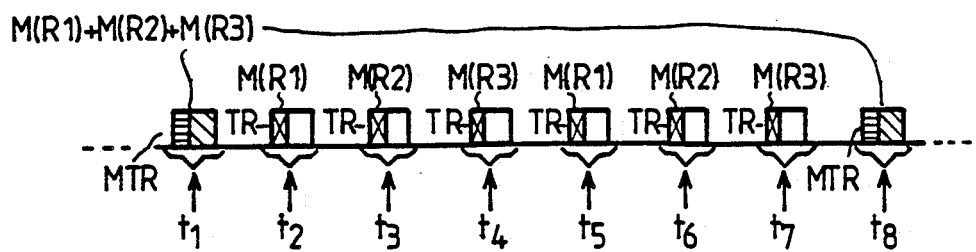
FIG. 2 is a time diagram showing the organization of the semaphore channel used in the system according to the invention.

In FIG. 1 the references R1, and R3 show the location of different relay stations. These different relay stations R1, R2 and R3 can be captured inside the zones Z1, Z2 and Z3. An access station M installed, for example, on board an automobile, travels inside these zones and a communication can be set up between this station M and another access station (not shown) by making use of relay stations. The problem which occurs thus, first of all, consists for the station M of connecting to one of the relay stations R1, R2 or R3. For this purpose a semaphore channel is used of which the organization is shown in FIG. 2. In this Figure are distinguished the instants designated t1, t2, t3 .... t8. At the instants t2, t3, t4, t5, t6, t7, the different relay stations radiate code signals characterizing them. Thus, at the instants t2 and t5 the relay station R1 radiates code signal M(R1) comprising its identification code accompanied by an error detecting code. In the same manner the relay station R2 will radiate at instants t3 and t6 a code signal M(R2) whereas the relay station R3 will radiate at the instants t4 and t7 a code signal M(R3). At instants t1 and t8 all the relay stations transmit their code signals, that is to say, that the superposition takes place of these different code signals, which is expressed by M(R1)+M(R2)+M(R3). Thus, the recognition of a single one of these code signals at the receivers of the access stations indicates that this code signal determines the best received relay station. The codes of the frames and multiframes required for obtaining a proper synchronization of the system are designated as TR and MTR.

Figure 3:
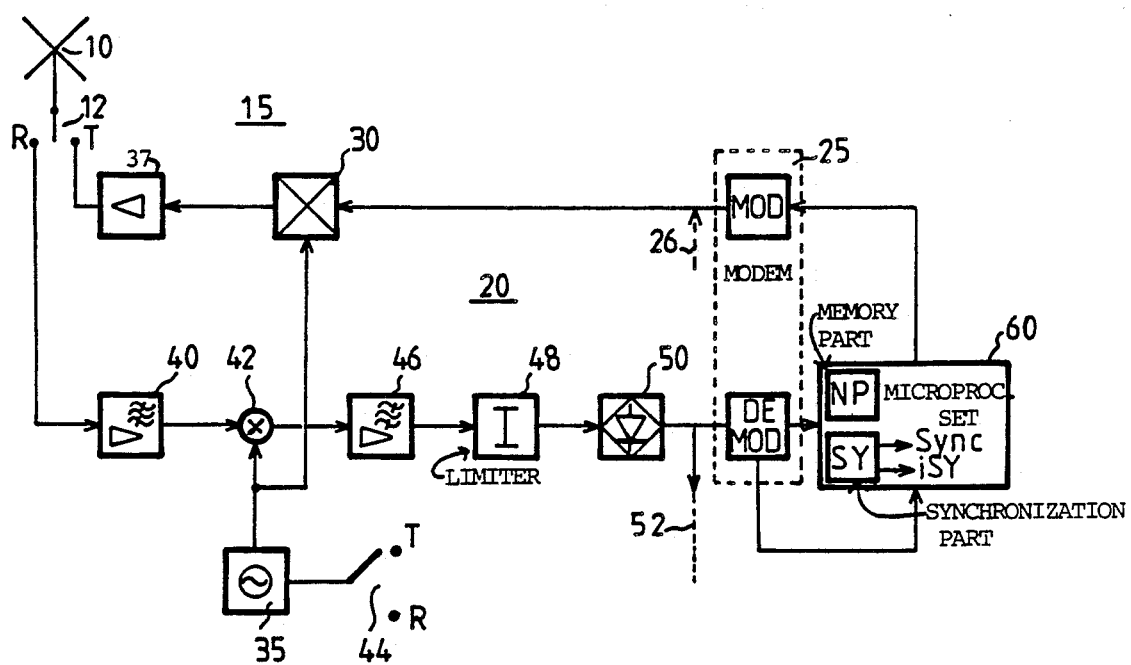
FIG. 3 shows in a schematic diagram the structure of an access station.

FIG. 3 shows, partly, the structure of an access station. The parts not shown are not necessary for comprehending the invention.

Reference 10 in this FIG. 3 shows the antenna of the station. This antenna is used both for tramsmission and reception. An antenna relay 12 having two positions R and T allows connecting this antenna 10 into either a transmission branch 15, the antenna relay 12 being at position T, or a receiving branch 20, the antenna relay 12 then being in position R. A modem circuit 25 is used for receiving and transmitting digital data specifically transmitted through the semaphore channel. The modulating portion MOD of this modem 25 is connected to the input of transmission branch 15 just like the telephone circuit (this is represented by the broken-line arrow 26). A modulator 30 modulates a carrier with the input signals to transmission branch 15; the carrier emanates from a local oscillator 35 which is also used by the receiving branch 20. A high-frequency amplifier 37 supplies the required level to the transmitting antenna 10. The receiving branch 20 comprises a preamplifier stage 40 for boosting the signals emanating from the antenna 10, and a frequency changing stage 42 being connected to the output of stage 40. This frequency changing stage also uses the local oscillator 35. It should be observed that the frequency thereof is changed accordingly as transmission or reception is effected. This change of frequency is symbolized by the switch 44 having two positions R and T actuated simultaneously with the antenna relay 12. Furthermore, the frequency of the output signal differs not only from the difference in duplex but also from the value of the intermediate frequency. At the output of stage 20 there is thus an intermediate-frequency amplifying stage 46, followed by a level limiter 48. A subsequent frequency discriminator 50 supplies, on the one hand messages to the demodulator portion DEMOD of the modem 25, and on the other hand speech signals to the sound portion. This is shown by a dotted-line arrow 52. The messages for establishing the connection between the access station and the relay station are managed and processed by a microprocessor set 60. In this set a synchronization part Sy is distinguished which supplies, as a function of the recognized code signals TR and MTR, the signals iSy providing as a function of time the expected number of time locations of the code signals emanating from the different relay stations. This portion Sy also provides a Sync signal indicating that the synchronization with a semaphore channel is maintained.

Figure 4B:
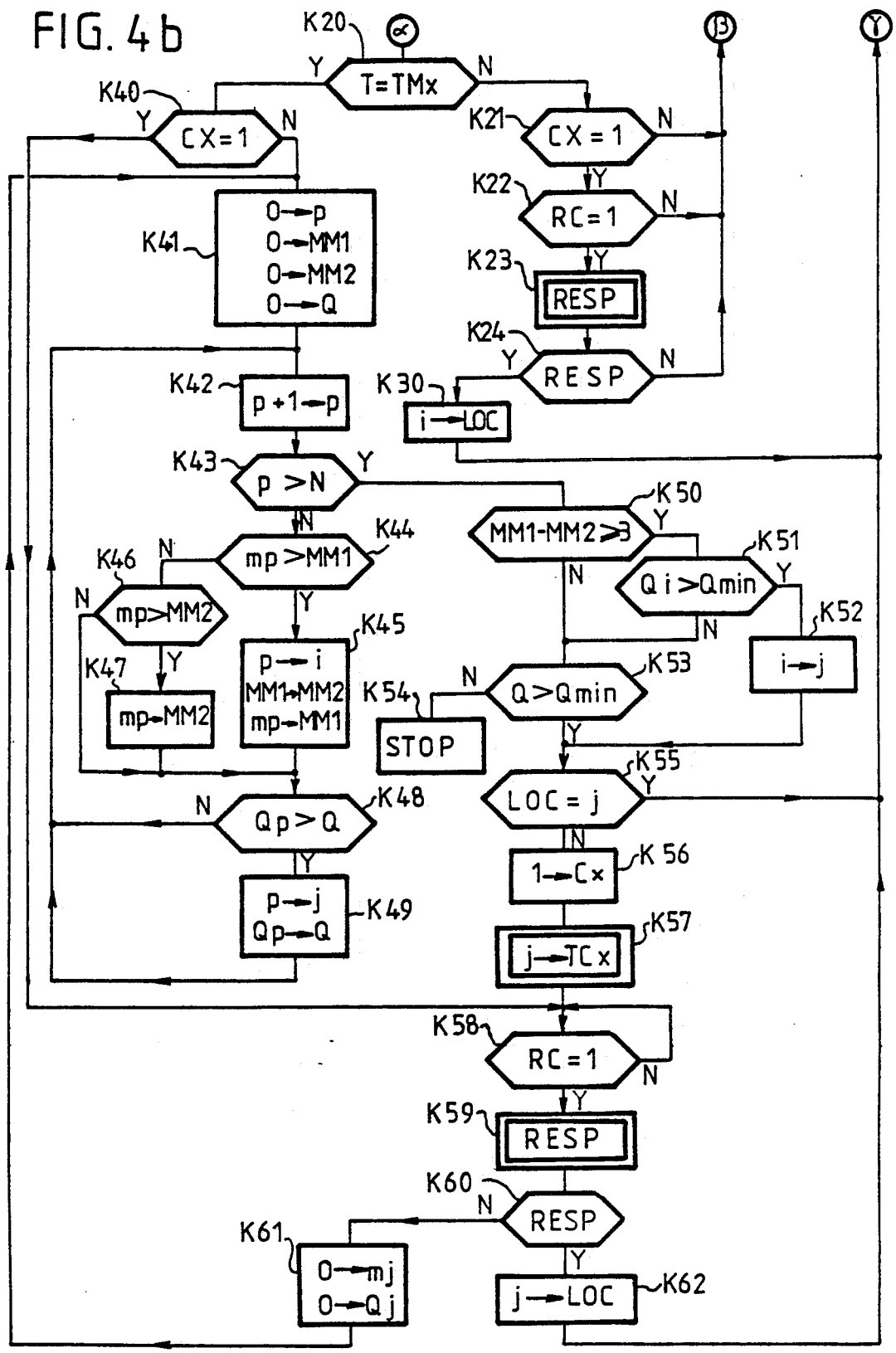

The operation of the microprocessor set 60 will now be explained with the aid of the flow charts shown in FIGS. 4a and 4b.

The flow chart of FIG. 4a begins with a box KO indicating the start of the sequence of the operating program as will presently be described. The next box K1 indicates a verification of the value of the Sync signal. The value "1" indicates that the synchronization is obtained and box K2 is proceeded to. This verification is also performed when the Sync value is not equal to 1. The box K2 represents the initiating phase of the program. Different counters m1, m2, ... mi, ... mN, are set to zero, each of them being assigned to a relay station and N thus representing the number of considered relay stations. A counter T is also set to zero. This counter T is incremented at the frames during which the receiver M compares the receiving quality of the code signals received from different stations R1, R2, ... RN. Different memory locations Q1, Q2, ... Qi, QN, each of them being assinged to one of the N relay stations, is initiated by a maximum value $O_{MAX}$. The box K3, which follows, consists of an analysis of the code signal of a relay station which has just been received. This analysis, not forming a part of the invention, will not be described and is explained in the aforementioned article entitled "Ramage, A Private Mobile Radiotelephone Network" published in 1986. This analysis provides a number Ne indicating the number of errors detected in the code signal M(Ri) transmitting the identification of one of the relay stations. This number Ne is verified in the box K4. A number of errors exceeding 10 or the erroneous reception of M(Ri) allows of passing on to box K5. As the recognition of M(Ri) has not been good, an indicator C is set to "0" and the number of the detected relay station "i" is determined by the signal iSy and not by the code signal M(Ri), and it is set at 10 in the memory location NP. IF Ne falls short of 10, box K6 is proceeded to; here indicator C is set at "1" and the number of the relay station "i" is determined by the recognition of the code signal M(Ri), the number of errors Ne is stored in a memory part NP. From boxes K5 or K6, box K10 is proceeded to where the message iSy is examined to know whether something happens at the instants (tl, t8 . . . ) when all the code signals of the relay stations are transmitted simultaneously; if this is the case, box K11 is proceeded to, if not, box K12.

In box K11, the indicator C is verified, if it indicates that the code signal M(Ri) has been received in good condition, the counter mi which is assigned thereto is incremented (box K13). If the code signal has been poorly received, box K14 is proceeded to. Then box K12 relates to the case when a code signal has been recognized outside the instants at which all the code signals are transmitted simultaneously. In this box K12 a correction is made of the signal quality, that is to say that this quality decreases by the number of errors supplied during the process of box K3. In box K14 the counter mi is examined with respect to the code signal determined in box K5 or K6; if the contents of the counter mi are no less than 3, the contents of the other counters mi containing the other relay stations (that is to say that j can ssume all values from 1 to N except for the value i), are examined (see box K15). If the tests relating to the given "i" and performed in the boxes K14 and K15 turn out to be positive, it is examined (see box K16) whether the access station was not already connected to the station Ri; this is indicated by the contents of a memory LOC. If it is already connected to the station Ri, box K17 is proceeded to; if it is not, boxes K18 and K19 are proceeded to where a connecting procedure is started. This procedure commences by putting indicator CX into position "1" (box K18) and the relay station, to which the access station is connected, is requested (box K19) to start the process of connecting to station Ri; this having been effected, box K17 is proceeded to where the counter T is incremented. The contents of this counter are compared to a limited value TMX (box K20, FIG. 4b). If the maximum value is not reached, box K21 is proceeded to. Here, the indicator CX is tested. If not a single request for a connection has been formulated, box K3 is returned to. If a request for a connection has been formulated, box K22 is proceeded to, where the indicator RC indicating whether the response has arrived is tested; if the test turns out negative box K3 is returned to. The box K23 which follows is a decoding procedure of the answer; if this is positive, box K30 is proceeded to where the connection to the station Ri is effected. When the contents of the counter have reached the maximum value TMX, it is there also tested, box K40, whether a request for a connection has been made. If this is not the case, in box K41 a search loop is triggered of the relay stations Ri received best. Therefore, one sets to zero an index p the memory MM1 in which the maximum value will be stored of the contents of the memories Mi, the memory MM2 in which will be stored the value immediately below the preceding maximum value, the value captured in the contents of the memory mi and finally the memory Q in which the maximum value is stored of the contents of the memories Qi. The search for these three values is effected in the loop including the boxes K42 to K49.

The box K42 corresponds with the incrementation of the index p used in this loop. The box K43 leves the loop when the index p exceeds N, N being the number of relay stations. The boxes K44 to K47 explain the searching for the values MM1 and MM2 explained hereinbefore; in the box K45 also the value of the index p, for which the value mp is highest, is stored. In the same fashion in boxes K48 and K49 effect the search for the maximum value contained in the counters Qi as well as the index p for which this maximum value is obtained.

When the search is ended by the verification of box K43, box K50 is proceeded to where it is verified whether the difference between the values MM1 and MM2 exceeds or is equal to 3. If this is the case, it is verified in box K51 whether the note Qi, having the same index as mi contained in MM1, exceeds a minimum value Qmin. If this is the case, in box K52 the value of the index is maintained in order to make an attempt for a connection with the corresponding relay station. In the opposite case it is verified, in box K53, whether the value Q exceeds Qmin. If this is not the case, box K54 is proceeded to and the program is stopped and, for example, it is left up to the user to make other attempts. If Q exceeds Qmin, box K55 is proceeded to.

In box K55 it is examined whether a connection has already been established with the relay station $R_j$. If this is the case, box K1 is returned to. If not, in box K56, the indicator CX is set to 1 and then, in box K57, the same procedure as indicated with respect to the box K10 is performed for the relay station $R_j$. Then, one proceeds to box K58 which is, finally, a waiting phase. This box K58 comes also after box K40 which as already been described, and relates to the case when the verification of CX is positive. When the answer returns (box K59) it is verified (box K60); if it is positive the connection is made to the relay station thus determined, box K62, upon which box K1 is returned to.

If the answer is negative one proceeds to the choice of another relay station; therefore one begins at the elimination of the choice of the relay station from which one has just received a negative answer by setting to zero, box K61, the values mj and Qj which correspond thereto, and box K41 is returned to.

The Applicants have chosen the following parameters for a convenient operation of the system.

The multiframe comprising a common code signal contains q times the frame sequence of the different code signals of each of the N relay stations.

QMAX=80q
Qmin=20q
TMAX=8(Nq+1)

Although the present invention has been particularly described with a flow chart showing as a preference that the first criterion is satisfied in the first place, that is to say the criterion based on the recognition of the code signals, as the case may be, it should be understood that within the scope of the invention, the second criterion can also be satisfied initially, that is to say the criterion based on the transmitted quality of the code signals. This can be effected by reversing the order of the tests K50 and K53.

What is claimed is:

1. In a radio system, means for establishing a connection for two-way communication between one of a set of relay stations and an access station, said connection establishing mean comprising:
   means for controlling said relay stations to simultaneously transmit in digital form in a semaphore channel at first predetermined instants first code signals in one to one correspondence with the relay stations, and separately transmit in said semaphore channel at second predetermined instants in one to one correspondence with the relay stations, second code signals;
   means in said access station for tapping said semaphore channel at said first and second predetermined instants, and for choosing a relay station from among said set of relay stations according to first and second criteria, said first criterion being based on recognition of a first code signal received in said first predetermined instants, and said second criterion being based on the quality of the second code signals received in the second predetermined instants.

2. the connection establishing means as calimed in claim 1, wherein said relay station is chosen by initially trying to satisfy said first criterion before said second criterion.

3. The connection establishing means as claimed in claim 1, wherein said relay station is chosen by initially trying to satisfy said second criterion before said first criterion.

* * * * *